(12) United States Patent (10) Patent No.: US 8,545,331 B2
Reams (45) Date of Patent: Oct. 1, 2013

(54) ASSISTING USE OF CONTROL DEVICES WITH DIFFERENT CONTENT PLAYERS IN A NETWORK

(75) Inventor: William R. Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 56 days.

(21) Appl. No.: 13/249,126

(22) Filed: Sep. 29, 2011

(65) Prior Publication Data

US 2013/0084986 A1 Apr. 4, 2013

(51) Int. Cl.
*G06F 17/00* (2006.01)

(52) U.S. Cl.
USPC .......................................................... 463/42

(58) Field of Classification Search
USPC ..................................... 463/40–42; 323/237
See application file for complete search history.

(56) References Cited

U.S. PATENT DOCUMENTS

| | | | |
|---|---|---|---|
| 7,433,930 B2 * | 10/2008 | Fenizia et al. | 709/217 |
| 7,516,251 B2 * | 4/2009 | Tanaka et al. | 710/33 |
| 7,962,097 B2 * | 6/2011 | Jung et al. | 455/41.2 |
| 8,126,938 B2 * | 2/2012 | Cohen et al. | 707/806 |
| 2003/0233436 A1 | 12/2003 | Slemmer et al. | |
| 2006/0253330 A1* | 11/2006 | Maggio et al. | 705/14 |
| 2010/0328132 A1 | 12/2010 | Reams et al. | |

FOREIGN PATENT DOCUMENTS

| | | |
|---|---|---|
| EP | 1345424 A1 | 9/2003 |
| EP | 1647958 A1 | 4/2006 |
| WO | 2010112972 A2 | 10/2010 |

OTHER PUBLICATIONS

European Patent Office "International Search Report and Written Opinion" dated Feb. 22, 2013 for International Appln. No. PCT/US2012/058006, filed Sep. 28, 2012.

* cited by examiner

*Primary Examiner* — Ronald Laneau
(74) *Attorney, Agent, or Firm* — Ingrassia Fisher & Lorenz, P.C.

(57) ABSTRACT

In various implementations, a remote transmits a first signal to a currently controlled first content player of a network of content players and a second signal to a proximate content player. If the first player is notified that a second player received the second signal, the first player may command the remote to activate a display associated with the second player. However, if the first player is not notified, the first player may command the remote to activate all known displays. In addition, the first player may also instruct the remote to configure which player the remote controls. In some implementations, the remote stores a table transmitted by a player of the network of players including entries corresponding to players and including commands for associated components. In such implementations, control configuration may include configuring which entry of the table is utilized.

20 Claims, 8 Drawing Sheets

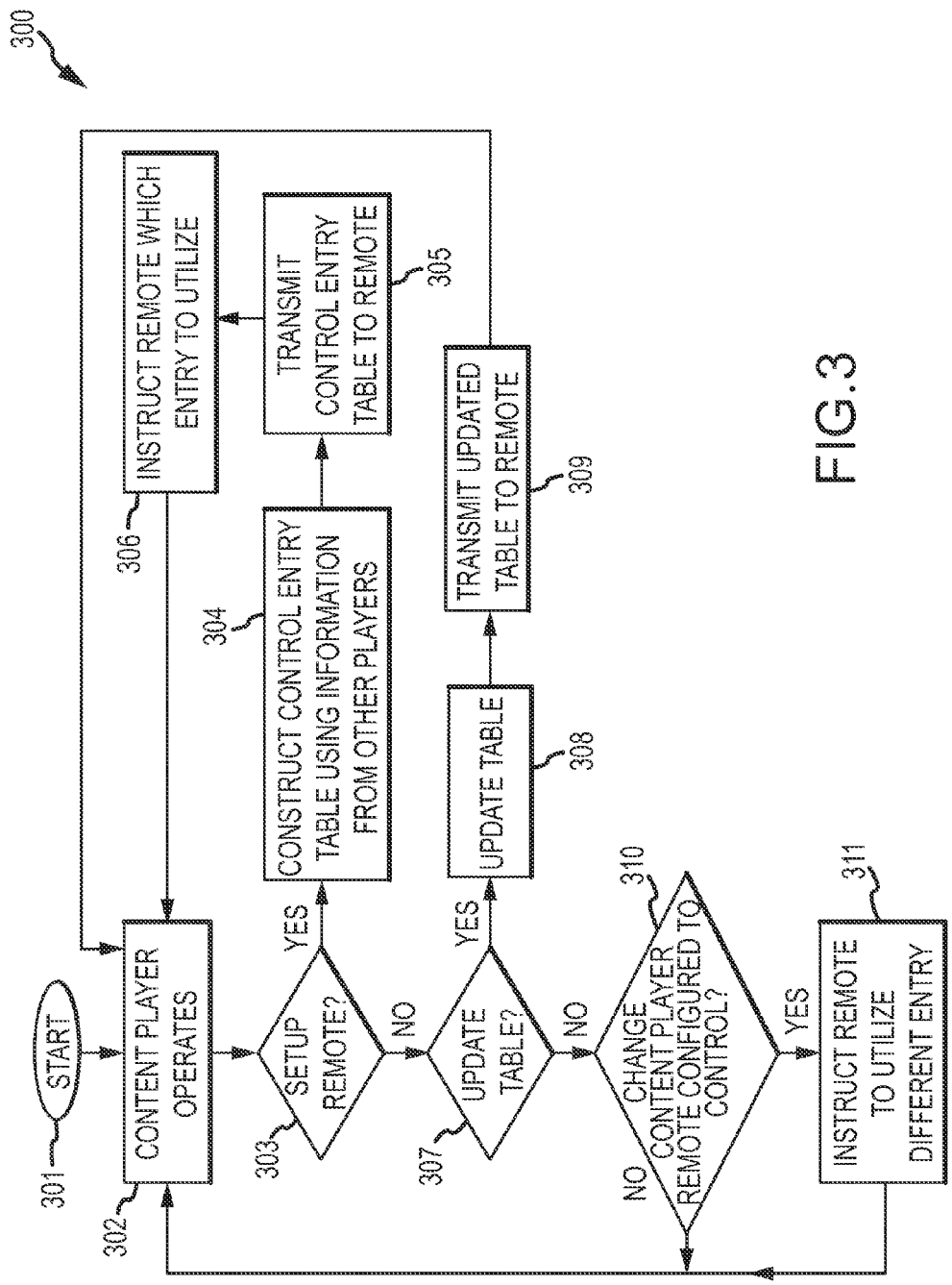

ASSISTING USE OF CONTROL DEVICES WITH DIFFERENT CONTENT PLAYERS IN A NETWORK

FIELD OF THE INVENTION

This disclosure relates generally to control devices for content players, and more specifically to assisting the use of control devices with different content players in a network of content players.

SUMMARY

The present disclosure discloses systems and methods for assisting use of control devices with different content players in a network of content players. In various implementations, a control device that is configurable to control one or more content players of a network of content players may transmit a plurality of signals indicating that a user wishes to utilize the control device in a particular area. The plurality of signals may include the first signal of a first type that is transmitted to a content player with which the control device is currently configured to control. The plurality of signals may also include a second signal transmitted to any content players that are located in the particular area. The particular area may include a content player if that content player is within proximity of the control device such that the content player can receive the second signal. A first content player may receive the first signal. If the first content player receives a notification from a second content player that received the second signal, the first content player may transmit a command to the control device to instruct a component associated with the second content player to activate. However, if the first content player does not receive the notification, the first content player may command the control device to instruct all components of a certain type (such as presentation devices) known to the control device to activate.

In such implementations, the first signal of the first type may be one or more radio frequency (RF) signals. Additionally, in such implementations the second signal of the second type may be one or more infrared (IR) signals and the command to activate the component(s) may include one or more IR command codes.

As such, components associated with a content player of the network of content players with which a user desires to configure the control device to control may be activated such that the respective content player may display one or more confirmation messages to confirm which content player the user wishes to configure the control device to control. In addition to assisting the control configuration process by commanding the control device to instruct one or more components to activate, the first content player may also instruct the control device to allow the control device to be configured to control another content player in the network of content players and/or command the control device to configure so as to control the other content player.

In some implementations, the control device may store a table of control entries transmitted by one or more of the content players of the network of content players wherein each entry corresponds to one of the content players and includes a control entry for the respective content player and may include a set of command codes for one or more components that are associated with the respective content player (though some sets may be empty sets as some content players may not be associated with any components). When a content player configures the control device to control the content player when the control device has not yet been configured to control other content players, the content player may construct the table by communicating with other content players in the network and transmitting the table to the control device. Subsequently, if information in the table changes (including replacing, removing, or adding devices), one or more content players in the network of content players may instruct the control device to update the stored table. In such implementations, configuring the control device to control a content player may include configuring the control device to utilize a particular entry of the table of pairing entries.

As such, in implementations where the control device is configurable to participate in the above discussed pairing process, the control device may reconfigured to control the second content player rather than the first content player by changing the entry the control device is configured to utilize from the entry corresponding to the first content player to the entry corresponding to the second content player.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 3 is a flow chart illustrating a second example method for assisting use of control devices with different content players in a network of content players. This method may be performed by the system of FIG. 1.

DETAILED DESCRIPTION OF THE EMBODIMENTS

Figure 1:
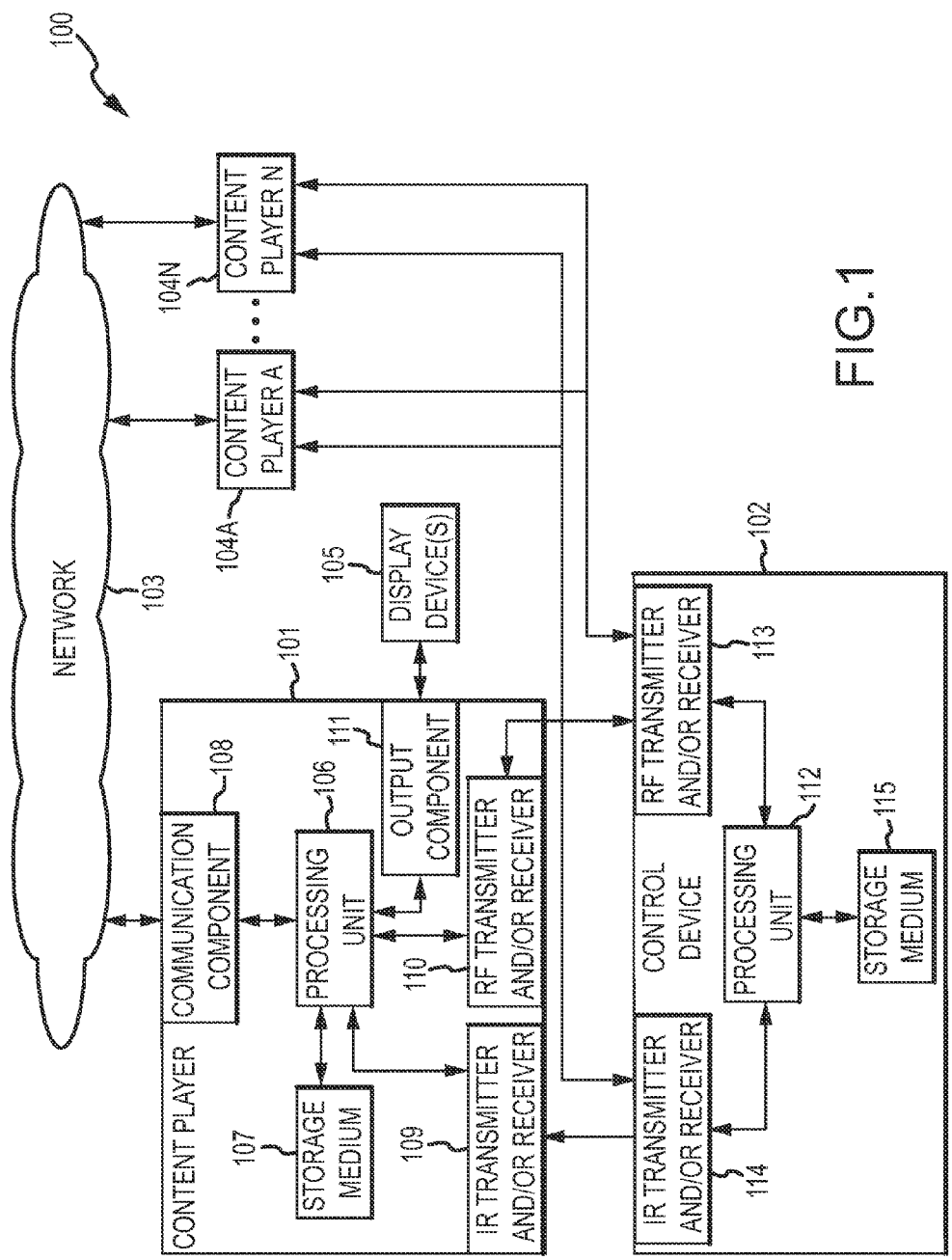
FIG. 1 is a block diagram illustrating a system for assisting use of control devices with different content players in a network of content players.

The description that follows includes sample systems, methods, and computer program products that embody various elements of the present disclosure. However, it should be understood that the described disclosure may be practiced in a variety of forms in addition to those described herein.

Content players (such as set top boxes, television receivers, digital video recorders, television tuners, digital music players, desktop computers, laptop computers, cellular telephones, smart phones, mobile computing devices, and so on) may present content via one or more presentation devices (such as computer monitors, televisions, cathode ray tube displays, liquid crystal displays, speakers, printers, and/or other such devices for presenting content). The content that such content players may present may be stored by the content player and/or may be received from one or more content providers (such as one or more television programming providers, video on demand providers, pay per view movie providers, digital music providers, and so on) via one or more communication links (such as one or more satellite communication links, coaxial cable communication links, WiFi communication links, Internet protocol communication links, and so on). The operations of such content players may be controlled via one or more control devices, such as one or more remote control devices.

In some cases, control devices may be dedicated to a particular content player. However, in other cases, a single control device may be configured to be utilized with one or more of a number of different content players and/or other devices at a particular time. For example, a number of different content players of a particular type may be arranged within a particular location. A control device may be configured such that the control device may be utilized to control any one of the different content players at a particular time. This may be accomplished by pairing the control device with the particular content player which the control device is to control. In order to utilize the control device to control a different content player, the control device may be paired with the different content player, effectively unpairing the control device from the content player with which the control device was previously paired.

However, in the present disclosure, when a control device is configured to control a first content player and is then reconfigured to control to a second content player, the control device may retain control information (including display device settings) related to the first content player in addition to gathering information regarding the second content player. As such, the control device may later be reconfigured to control the first content player without having to go through a pairing process. Additionally, while the control device is configured to control the first content player, the first content player may obtain control information (and related display device information) from the second content player across the network and provide that control information to the control device. Thus the control device may be reconfigurable to control the second content player without the need to go through a pairing process with the second content player.

In addition to controlling the content player with which the control device is paired, the control device may be configurable to control various electronic device that are associated with the paired content player. For example, a content player may be associated with a television on which the content player may present content. When the control device is paired with the content player such that the control device is operable to control the content player, the control device may also be configured to control the television. As such, the control device may be utilized to control the content player and control operations of the television that are related to the content player (turning the television on and/or off, altering volume, and so on).

In some cases, pairing a control device with a content player may involve one or more complicated and burdensome operations. A user may have to manually configure the control device and/or the content player in order to pair the control device with the content player. In other cases, the control device and/or content player may be configurable to perform various operations to aid in pairing the control device with the content player. Such operations may include signaling that a user wishes to pair the control device with a particular content player located in a particular area (and/or the content player with which the control device is currently paired), displaying a prompt utilizing a presentation device associated with the particular content player requesting confirmation that the control device is to be paired with the particular content player, and pairing the control device with the particular content player if an affirmative response to the confirmation is received.

However, prior to pairing the control device with the particular content player, the control device may not be configured to control the presentation device that is associated with the particular content player. If the presentation device is not activated (i.e., powered on), the prompt to confirm pairing may not be presented. The control device may be configured to transmit instructions to presentation devices to power on as part of initiating such a pairing sequence, but even if the control device is configured to control presentation devices associated with the content player with which the control device is paired the control device may not be configured to control presentation devices associated with the particular content player with which a user intends to pair the control device. As such, the user may be required to manually power on the appropriate presentation device in order to complete such a pairing operation and/or locate and utilize another control device associated with the appropriate presentation device. These additional operations may make the process of pairing a control device with a content player more burdensome and/or difficult for a user.

The present disclosure discloses systems and methods for assisting use of control devices with different content players in a network of content players. A first content player in a network of content players may receive a first signal from a control device which may be sent by the control device as part of a plurality of signals that a user intends to utilize the control device in a particular area. The plurality of signals may include the first signal (which may be a first type of signal such as a radio frequency signal transmitted to the first content player because the control device is currently paired with the first content player) and a second signal (which may be a second type of signal such as an infrared signal) transmitted to any content players that are located in the particular area (within proximity of the control device such that they can be reached by the second signal). If the first content player, which receives the first signal, receives a notification from a second content player that received the second signal, the first content player may transmit a command to the control device to instruct a component associated with the second content player to activate. However, if the first content player does not receive a notification from a second content player that received the second signal, the first content player may command the control to instruct all components of a certain type (such as presentation devices) known to the control device to activate. In this way, components associated with content players may be activated such that messages regarding configuring the control device to control one or more content players may be presented.

In addition to assisting the control configuration process by commanding the control device to instruct one or more components to activate, the first content player may store a table of control entries transmitted by one or more of the content players of the network of content players wherein each entry corresponds to one of the content players and may include a control entry for the respective content player and set of command codes for one or more components that are associated with the respective content player (though some sets may be empty sets as some content players may not be associated with any components). In some implementations, the control device may also instruct the control device to allow the control device to be configured to control another content player in the network of content players and/or command the control device to configure so as to control the other content player. In such implementations, configuring the control device to control a content player may include configuring the control device to utilize a particular entry of the table of control entries. Further, reconfiguring the control device to no longer control a content player and reconfiguring the control device to control another content player may include altering the particular entry of the table of control entries which the control device is configured to utilize.

FIG. 1 is a block diagram illustrating a system 100 for assisting use of control devices with different content players in a network of content players. The system 100 includes a content player 101 and content players A-N 104A-104N (which each may be any kind of content player such as a set top box, a television receiver, a digital video recorder, a television tuner, a digital music player, a desktop computer, a laptop computer, a cellular telephone, a smart phone, a mobile computing device, and/or any other kind of device operable to play content) that are communicably coupled by one or more networks 103 (which may be an Ethernet network, a coaxial cable network, a MoCA® (Multimedia Over Coax Alliance) network, a WiFi network, a HomePlug network, and/or any other kind of network that communicably connects the content player 101 and the content players A-N 104A-104N). The system may also include a control device 102 which may be configured to control the content player 101 and/or the content players A-N 104A-104N in order to control the content player 101 and/or the content players A-N 104A-104N.

The content player 101 (and/or the content players A-N 104A-104N) may include one or more processing units 106, one or more non-transitory storage media 107 (which may take the form of, but is not limited to, a magnetic storage medium; optical storage medium; magneto-optical storage medium; read only memory; random access memory; erasable programmable memory; flash memory; and so on), one or more communication components 108, one or more infrared (IR) transmitters and/or receivers 109, one or more radio frequency (RF) transmitters and/or receivers 110, and/or one or more output components 111. The processing unit 106 may execute instructions stored in the non-transitory storage medium 107 to transmit content (such as content stored in the non-transitory storage medium 107 and/or content being received via the communication component 108 and/or non-networked communication components not shown such as a satellite receiver component) to one or more presentation devices, such as one or more display devices 105 and/or devices not shown such as audio amplifiers, via the output component. Further, the processing unit 106 may execute instructions stored in the non-transitory storage medium 107 to communicate with other content players connected to the network 103 via the communication component and/or send signals to and/or receive signals from the control device 102 via the infrared transmitter and/or receiver 109 and/or the radio frequency transmitter and/or receiver 110.

The control device 102 may include one or more processing units 112, one or more non-transitory storage media 115, one or more IR transmitters and/or receivers 114, and/or one or more RF transmitters and/or receivers 113. The processing unit 112 may execute instructions stored in the non-transitory storage medium 115 to initiate a configuration sequence to configure to control the content player 101 and/or the content players A-N 104A-104N and/or control the content played of the content player 101 and/or the content players A-N 104A-104N with which the control device is configured to control. In some cases, such operations may be performed in response to user input received via one or more user input elements included by the control device (not shown). For example, the control device may include a dedicated "configure to control device" button that initiates a configuration sequence to configure the control device to control a content player which is within IR signaling proximity of the control device. By way of another example, attempting to utilize the control device with a content player that is not currently configured to be controlled with the control device may initiate a configuration sequence to configure the control device to control the content player not previously controlled by the control device.

In various implementations, a configuration sequence to configure the control device 102 to control one of the content player 101 and/or the content players A-N 104A-104N may include transmitting a RF signal to the content receiver with which the control device is currently configured to control via the RF transmitter and/or receiver 113 and transmitting an IR signal to a content player which is within IR signaling proximity to the control device (and to which the control device is to be configured to control) via the IR transmitter and/or receiver 114. As the IR signal may only be received by a content player that is located proximate and within line-of-sight to the control device, if a user indicates via the control device that the user wishes to utilize the control device in a particular area it is probable that only a content player in that particular area may receive the IR signal As the RF signal may have a greater range than the IR signal and may pass through structures such as walls and doors, it is probable that the content player with which the control device is currently configured to control may receive the RF signal even if that content player is not in the particular area where the user indicates that the user wishes to utilize the control device. In some cases, the configuration sequence may also include transmitting an instruction to a component associated with the content player within IR signaling proximity of the control device (such as the display device 105) to activate (power on) via the IR transmitter and/or receiver 114.

The content player with which the control device 102 is already configured to control, such as the content player 101, may receive the RF signal. If the content player 101 also receives the IR signal, such as if the content player 101 is within the area where the user indicated that the user wished to utilize the control device, the content player 101 may abort the configuration sequence as the content player 101 is already controlled by the control device.

If, however, the content player 101 does not receive the IR signal, the content player 101 may determine whether or not another content player connected to the network 103 (such as one of the content players A-N 104A-104N) notifies the content player 101 that the other content player has received the IR signal. If so, the content player 101 may determine that the user has requested to configure the control device 102 to control the other content player. As such, the content player 101 may command the control device to instruct a presentation device (such as the display device 105) associated with the other content player to activate (i.e., power on). Such a command may include one or more IR codes for activating the component associated with the other content player (which may be stored in the non-transitory storage medium 107 and/or the non-transitory storage medium 115). The other content player may present a prompt via the associated component that may request the user to confirm that the user wishes to configure the control device to control the other content player and/or associated equipment. If an affirmative response is received, the content player 101 may instruct the control device to allow the control device to be configured to control the other content player. Such instruction may include commanding the control device to utilize an entry in a table of control entries that corresponds to the other content player. Alternatively, such instruction may include instructing the control device to unpair from the control device so that the other content player may pair with the control device.

However, even if a target content player is within the area in which the user has indicated that the user wishes to utilize the control device 102, the target content player may not receive the IR signal (such as if an IR transmitter and/or receiver of the target content player is blocked). As such, if the content player (such as the content player 101) that receives the RF signal determines that another content player connected to the network 103 (such as one of the content players A-N 104A-104N) has not notified the content player 101 that the IR signal was received, the content player 101 may command the control device to instruct all presentation devices known to the control device to be associated with any content player connected to the network 103 to activate. The content player 101 may also command all content players connected to the network 103 to present a prompt requesting the user confirm whether or not to configure the control device to control the respective content player on the presentation device associated with the respective content player. The content player 101 may then determine which of the content players connected to the network 103 to which the user wishes to configure the control device to control based on which response is received for which prompt. As such, the content player 101 may instruct the control device to allow the control device to be configured to control the determined content player. Such instruction may include commanding the control device to utilize an entry in a table of control entries that corresponds to the determined content player. Alternatively, such instruction may include instructing the control device to unpair from the control device so that the determined content player may pair with the control device.

In one or more implementations, the control device 102 may store a table of control entries received from one or more content players (such as the content player 101 and/or the content players A-N 104A-104N) connected to the network 103. Each of the control entries may correspond to one of the content players and may include a control entry for the respective content player (such as a RF entry) and a set of command codes (such as IR command codes) for components that are associated with the respective content player. The control device 102 may be configured to control and/or configured to no longer control one or more of the content players by configuring which of the entries in the table the control device is set to utilize. As such, when the control device reconfigures to no longer control a particular content player and to control another content player, the control device may be configured to utilize the entry corresponding to the other content player instead of the entry corresponding to the particular content player.

In such implementations, the table of control entries may be constructed by one or more of content players connected to the network 103, such as the content player 101 and/or the content players A-N 104A-104N. In constructing the table of control entries, the content player may communicate with other content players connected to the network in order to determine entries to create for each content player, command codes to include in the entries for the respective content player for associated components (though some entries may not include command codes for components associated with the content player corresponding to that entry as some content players may not be associated with components), and so on. If the content player constructing the table of control entries determines that the control device 102 does not currently store the table of entries, the content player may transmit the table of entries to the control device and also may instruct the control device as to which of the entries to utilize. The control device may subsequently be reconfigured to no longer control a currently controlled content player and to control a different content player by updating which entry in the table of pairing entries that the control device is configured to utilize.

Additionally, one or more of the content players connected to the network 103, such as the content player 101 and/or the content players A-N 104A-104N, may determine that the table of entries stored by the control device 102 contains information that is inaccurate. The information in the table of entries stored by the control device may be out of date if one or more content players have been added to and/or removed from the network, if one or more components have been associated and/or de-associated with one or more content players connected to the network, and so on. If the content player determines that the table of entries stored by the control device 102 contains information that is inaccurate, the content player may command the control device to update the inaccurate information. Such updating may be performed as soon as the information becomes inaccurate, upon a set update schedule (such as at 3 am every morning), and so on.

Although the system 100 is illustrated and described above such that the first signal is an RF signal and the second signal is an IR signal, other signal types are possible. For example, the second signal may be a type of signal other than an IR signal that may be received by content players within a certain proximity to the control device (such as twenty feet) whereas the first signal may be a type of signal other than a RF signal that may be received by a content player paired with the control device that is outside of the certain proximity to the control device.

Figure 2:
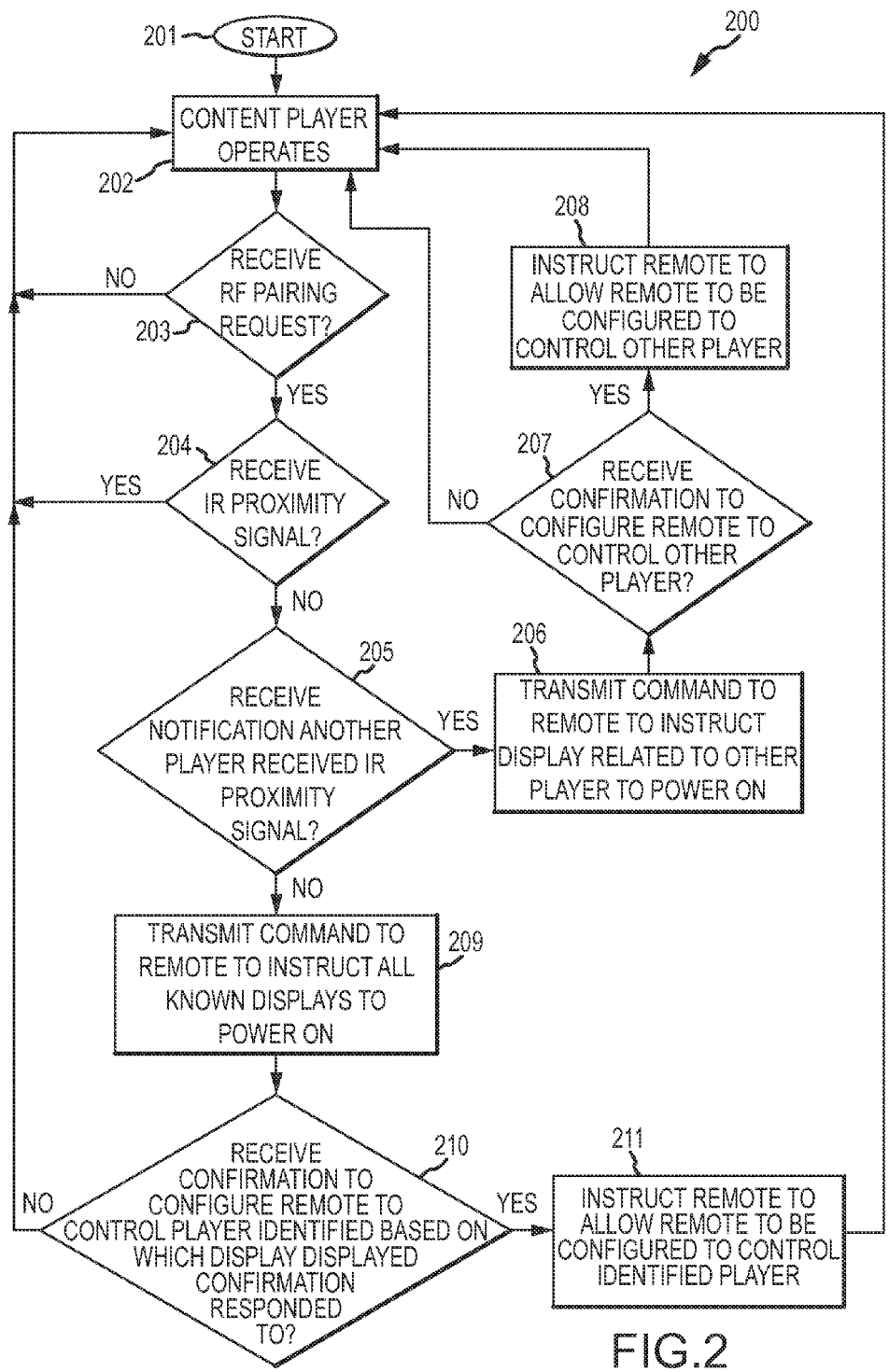
FIG. 2 is a flow chart illustrating a first example method for assisting use of control devices with different content players in a network of content players. This method may be performed by the system of FIG. 1.

FIG. 2 illustrates a method 200 for assisting use of control devices with different content players in a network of content players. The method 200 may be performed by the content player 101 of FIG. 1. The flow begins at block 201 and proceeds to block 202 where content player 101 operates. The flow then proceeds to block 203 where the processing unit 106 determines whether or not the content receiver 101 receives a first signal from a control device 102 (such as a remote control device) that is currently configured to control the content receiver 101 indicating that a user intends to utilize the control device in an area. If so, the flow proceeds to block 204. Otherwise, the flow returns to block 202 where the content receiver 101 continues to operate.

At block 204, after the processing unit 106 determines that the content receiver 101 receives the first signal, the processing unit determines whether or not the content receiver 101 receives a second signal that the control device 102 transmitted to a content player located in the area in which the user intends to utilize the control device. If so, the flow returns to block 202 and the content player 101 continues to operate, as the content player 101 is already controlled by the control device. Otherwise, the flow proceeds to block 205.

At block 205, after the processing unit 106 determines that the content receiver does not receive the second signal, the processing unit determines whether or not the content receiver receives a notification from another content player connected to the network 103 indicating that the other content receiver received the second signal. If so, the flow proceeds to block 206. Otherwise, the flow proceeds to block 209.

At block 206, after the processing unit 106 determines that the content receiver 101 receives the notification, the processing unit transmits a command to the control device 102 to instruct a display related to the other content player to activate (i.e., power on). The flow then proceeds to block 207. At block 207, the processing unit determines whether or not a confirmation to configure the control device to control the other player has been received. If so, the flow proceeds to block 208. Otherwise, the flow returns to block 202 and the content player 101 continues to operate under the control of the control device.

At block 208, after the processing unit 106 determines that a confirmation to configure the control device 102 to control the other content player has been received, the processing unit instructs the control device to allow the control device to be configured to control the other content player. As part of such, if the control device is not capable of controlling multiple content players simultaneously, the processing unit may instruct the control device to reconfigure such that the control device no longer controls the content player 101. The flow then returns to block 202 and the content player continues to operate.

At block 209, after the processing unit 106 determines that the content receiver 101 does not receive the notification, the processing unit transmits a command to the control device 102 to instruct all displays known to the control device to be associated with any content player connected to the network 103 to activate (i.e., power on). The processing unit may also signal the other content players to display confirmation prompts on their associated displays indicating for the user to make a particular selection to configure the control device to control the content player associated with that display. The flow then proceeds to block 210. At block 210, the processing unit determines whether or not a confirmation to configure the control device to control another content player identified based on the display which displayed the confirmation prompt to which a response was received. If so, the flow proceeds to block 211. Otherwise, the flow returns to block 202 and the content player 101 continues to operate.

At block 211, after the processing unit 106 determines that a confirmation to configure the control device 102 to control another content player was received based on the displayed confirmation prompt, the processing unit instructs the control device to allow the control device to be configured to control the identified content player. As part of such, if the control device is not capable of controlling multiple content players simultaneously, the processing unit may instruct the control device to reconfigure such that the control device no longer controls the content player 101. The flow then returns to block 202 and the content player continues to operate.

Although the method 200 is illustrated and described as including particular operations performed in a particular order, other arrangements of other operations are within the scope of the present disclosure. By way of a first example, in other implementations, the order of blocks 203 and 204 may be reversed. By way of another example, the control device 102 may be configured to anticipate receipt of the command transmitted in either block 206 or 209 and if such a command is not received with a period of time (such as two seconds), the control device may act as if the command transmitted in block 209 was received. As such, if the processing unit 106 determines at block 204 that the content receiver 101 receives the second signal, the processing unit may transmit a command to the control device instructing the control device to omit instructing any displays to power on.

FIG. 3 illustrates a method 300 for assisting use of control devices with different content players in a network of content players. The method 300 may be performed by the content player 101 of FIG. 1. The flow begins at block 301 and proceeds to block 302 where the content player 101 operates. The flow then proceeds to block 303 where the processing unit 106 determines whether or not to set up the control device 102 (such as a remote control device). The processing unit may determine to set up the control device if a request to configure the control device to control the content player 101 is received and the control device has not yet been configured to control a content player connected to the network 103. If so, the flow proceeds to block 304. Otherwise, the flow proceeds to block 307.

At block 304, after the processing unit 106 determines to set up the control device 102, the content player 101 constructs the table of control entries. As part of the table of control entries, the content player 101 communicates with other content players connected to the network 103 to determine entries to create as well as one or more sets of command codes (such as IR command codes) for components associated with the content player corresponding to the respective entry (though some entries may not include any command codes as some content players may not be associated with any components). The pairing entry table may also include information needed to allow the control device to communicate via RF with other content players (such as the content players 104A-N). Such information could include for example media access control (MAC) addresses, personal area network (PAN) identifiers and addresses, encryption keys, and so on. The flow then proceeds to block 305 where the processing unit transmits the table of control entries to the control device before the flow proceeds to block 306. At block 306, the processing unit transmits an instruction to the control device instructing the control device to utilize a particular entry of the table of control entries. The flow then returns to block 302 where the content player 101 continues to operate.

At block 307, after the processing unit 106 determines not to set up the control device 102, the processing unit determines whether or not to update the table of control entries. The processing unit may determine to update the table of control entries if the processing unit determines that information in the table has changed (such as in response to information received from another content player). If so, the flow proceeds to block 308. Otherwise, the flow proceeds to block 310.

At block 308, the processing unit 106 determines to update the table of control entries, the processing unit updates the table of control entries. Then the flow proceeds to block 309 where the processing unit transmits the updated table to the control device 102 before the flow returns to block 302 and the content player 101 continues to operate.

At block 310, the processing unit 106 determines not to update the table of control entries, the processing unit determines whether or not to change content player to which the control device 102 is configured to control. If not, the flow returns to block 302 where the content player 101 continues to operate. Otherwise, the flow proceeds to block 311 where the processing unit transmits an instruction to the control device instructing the control device to utilize a different entry in the table of control entries that corresponds to the content player to which the control device is to be configured to control. The flow then returns to block 302 where the content player 101 continues to operate.

Although the method 300 is illustrated and described as including particular operations performed in a particular order, other arrangements of other operations are within the scope of the present disclosure. For example, blocks 308 and 309 are illustrated as separate operations performed in a linear sequence. However, in various implementations the content player 101 may instruct the control device 102 to update the stored table instead of updating the table and then transmitting the updated table to the control device.

Figure 4A:
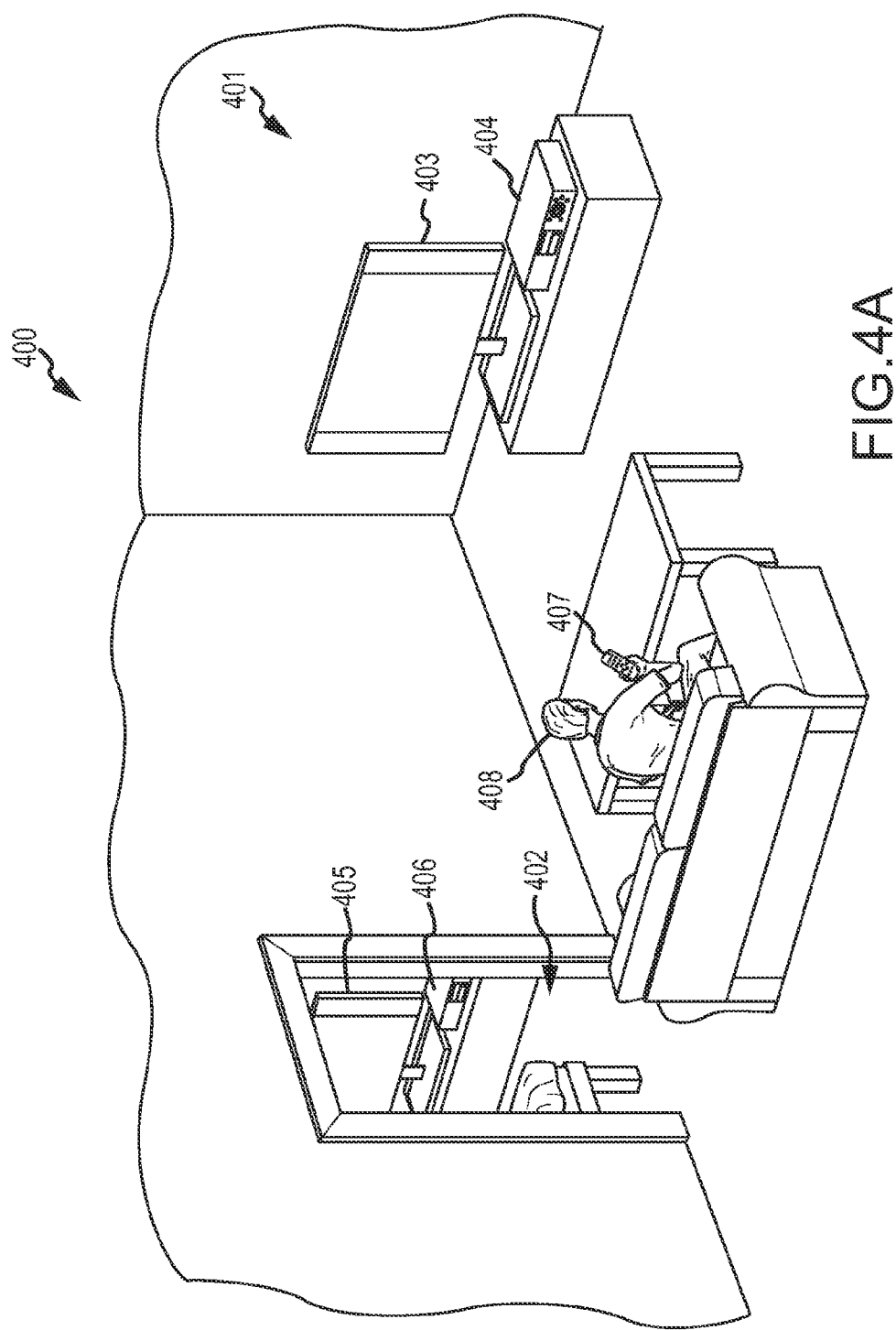
FIGS. 4A-4E are diagrams illustrating a user utilizing a system for assisting use of control devices with different content players in a network of content players. The system may be the system of FIG. 1.

FIGS. 4A-4E illustrate a user 408 utilizing a system 401 for assisting use of a control device 407 with different content players 404 and 406 in a network of content players. As illustrated in FIG. 4A, a user 408 is present in a living room 401. The user is illustrated as holding a remote control device 407 that is configured to control a set top box 404. The set top box 404 is associated with a television 403. The remote control may contain information related to controlling the television 403 with IR transmissions. However, the television 403 is not illustrated as powered on (although in other implementations the television 403 may be powered on or powered off). As also illustrated in FIG. 4A, a bedroom 402 is separate from the living room 401. A set top box 406 and an associated television 405 are located in the bedroom 402. However, the television 405 is also not illustrated as powered on.

Figure 4B:
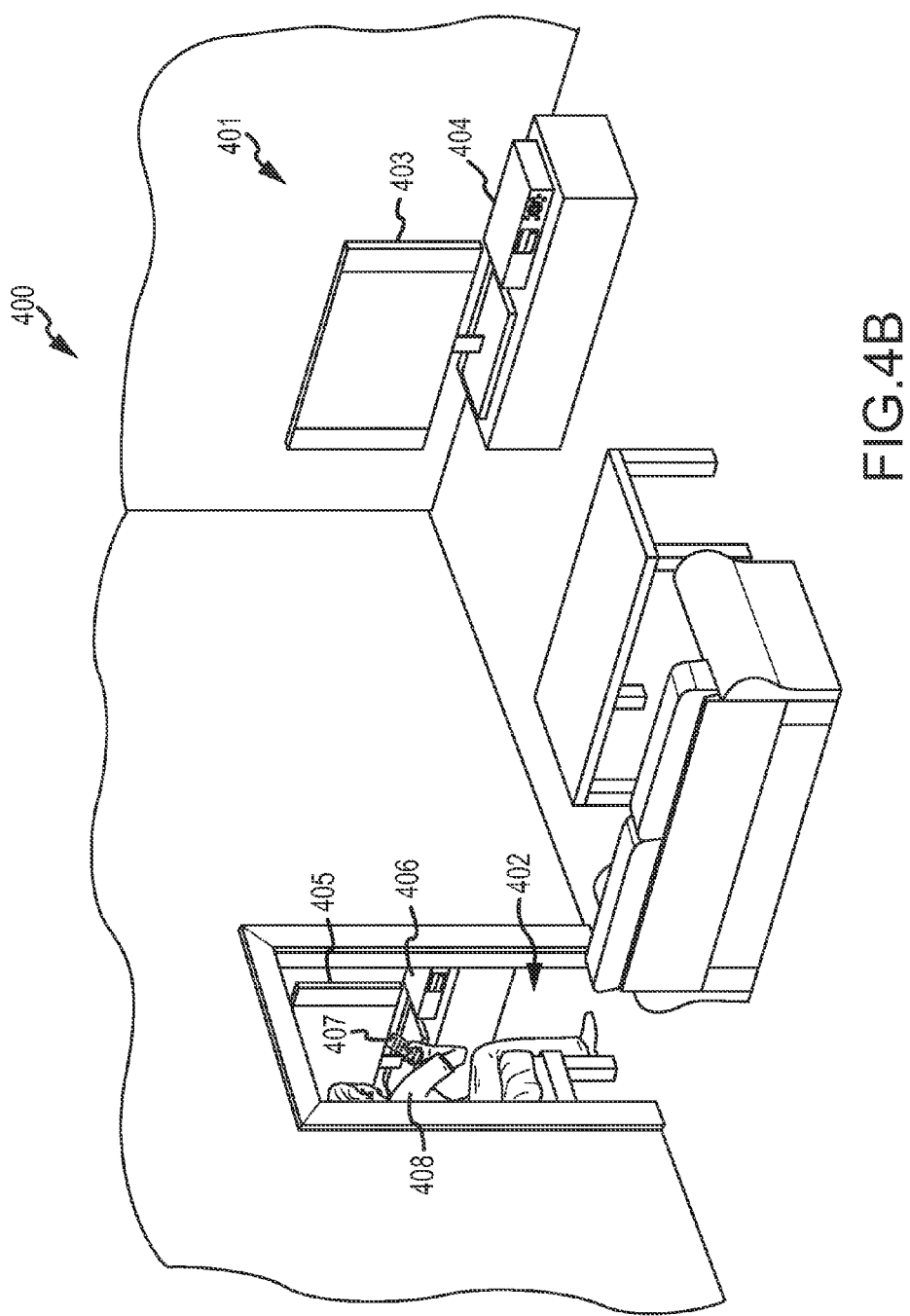
Figure 4C:
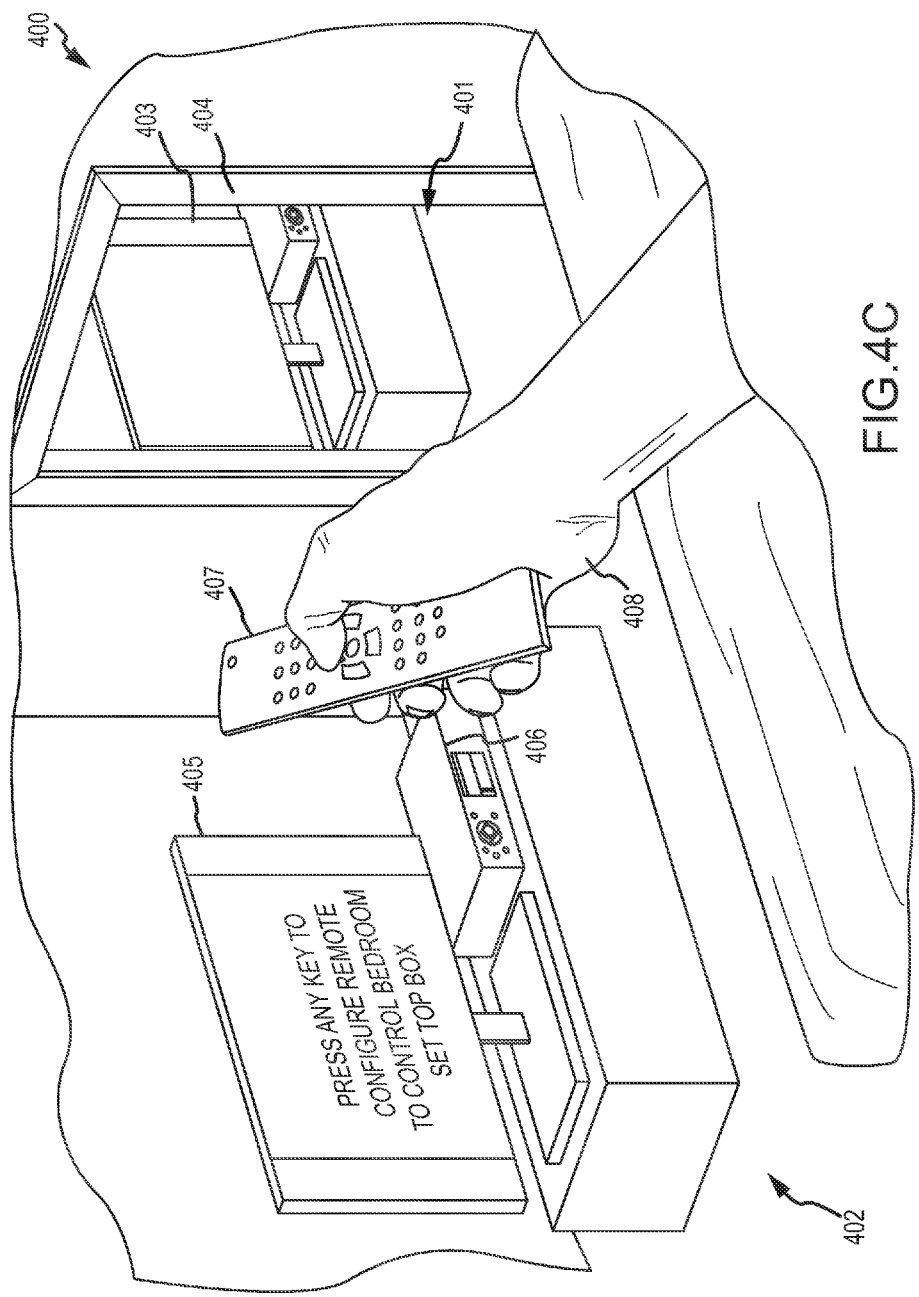
Figure 4D:
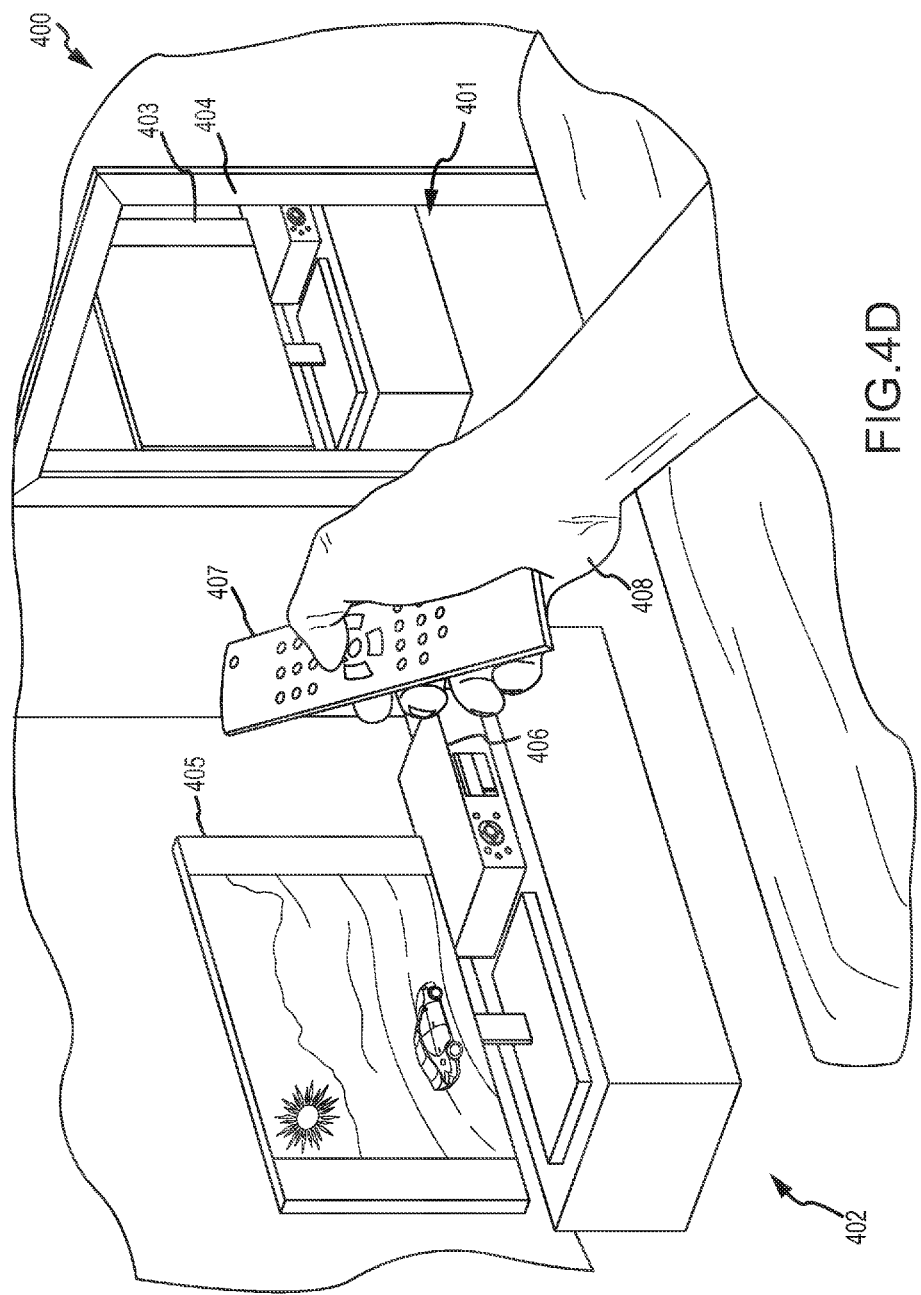

As illustrated in FIG. 4B, the user 408 may move into the bedroom 402 and indicate via one or more buttons or other controls of the remote control device 407 that the user wishes to utilize the remote control device in the bedroom. As such, the remote control device may transmit a first signal to the set top box with which the remote control device is configured to control (i.e., the set top box 404) and a second signal to a set top box in the area of the bedroom (i.e., the set top box 406). The set top box 404 may receive the first signal and may receive a notification from the set top box 406 that the set top box 406 has received the second signal. In response, the set top box 404 may command the remote control device to instruct the television 405 to activate or power on. As illustrated in FIG. 4C, the television 405 may then power on and the set top box 406 may display a confirmation prompt on the television 405 requesting that the user confirm that the user wishes to configure the remote control device to control the set top box 406. If confirmation is received, the remote control device may be instructed by set top box 404 (in this implementation) to reconfigure from being configured to control the set top box 404 to being configured to control the set top box 406. The reconfiguration may be accomplished by utilizing a different control entry in a memory of the remote control. In other implementations, the reconfiguration may be accomplished by depairing the remote control from the set top box 404 and pairing the remote control with the set top box 406. The remote control device may then be utilized to control the set top box 406 as illustrated in FIG. 4D.

Figure 4E:
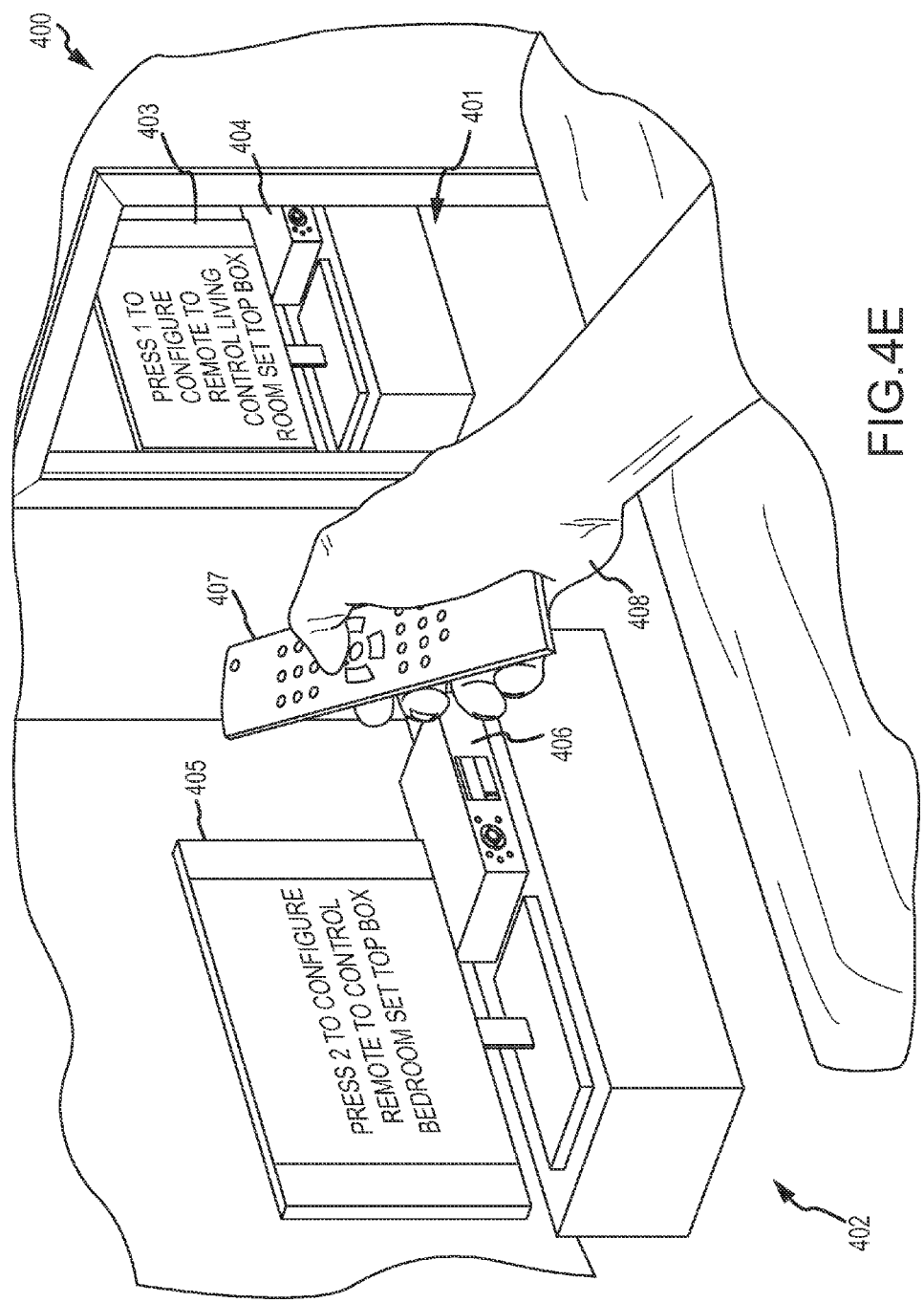

However, returning to FIG. 4B, the set top box 404 may receive the first signal but may not receive a notification from the set top box 406 that the set top box 406 has received the second signal. This may be because the set top box 406 did not receive the second signal. Hence, the set top box 404 may command the remote control device 407 to instruct all known televisions to activate or power on and command set top boxes associated with such televisions to display a prompt asking the user 408 to confirm that the user wishes to utilize the remote control device with the set top box associated with that television, as illustrated in FIG. 4E. If confirmation is received in response to the prompt displayed by one of the televisions, the remote control device may be configured to control the set top box that displayed the prompt (if the remote control is not already configured to control the set top box that displayed the prompt, in which case the configuration is not changed). If a response to the confirmation displayed by the television 405 is received, indicating that the user has selected to configure the remote control device to control the set top box 406, the remote control device may reconfigure from being configured to control the set top box 404 and TV 403 to being configured to control the set top box 406 and TV 405. The reconfiguration may be accomplished by utilizing a different control entry in a memory of the remote control. In other implementations, the reconfiguration may be accomplished by depairing the remote control from the set top box 404 and pairing the remote control with the set top box 406. The remote control device may then be utilized to control the set top box 406 as illustrated in FIG. 4D.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for assisting use of control devices with different content players in a network of content players, the method comprising:

receiving, at a first content player of a network of content players, a first signal of a first type of signal from a control device that is configured to control the first content player wherein the control device transmitted the first signal as part of transmitting a plurality of signals indicating that a user intends to utilize the control device in a particular area, the plurality of signals further including a second signal of a second type of signal transmitted to a content player of the network of content players located in the particular area;

if the first content player receives a notification from a second content player of the network of content players that the second content player has received the second signal, transmitting at least one command from the first content player to the control device commanding the control device to instruct at least one component that is associated with the second content player to activate wherein the at least one component that is associated with the second content player is a particular type of component; and if the first content player does not receive the notification from the second content player that the second content player has received the second signal and the first content player does not receive the second signal, transmitting at least one command from the first content player to the control device commanding the control device to instruct all components of the particular type of component known to the control device to be associated with any content player of the network of content players to activate.

2. The method of claim 1, wherein the first type of signal comprises at least one radio frequency signal and the second type of signal comprises at least one infrared signal.

3. The method of claim 1, wherein the plurality of signals further includes at least one third signal transmitted to at least one component of the particular type of component that is associated with the first content player instructing the at least one component of the particular type of component that is associated with the first content player to activate.

4. The method of claim 1, wherein the first content player receives the notification from the second content player that the second content player has received the second signal, further comprising if the first content player receives a response to a confirmation to utilize the control device with the second content player presented by the at least one component that is associated with the second content player, instructing the control device to configure to control the second content player.

5. The method of claim 4, wherein the control device includes at least one table of control entries received from at least one content player of the network of content players wherein each of the control entries correspond to a content player of the network of content players and include a set of command codes for at least one component associated with the content player and wherein said instructing the control device to configure to control the second content player further comprises instructing the control device to utilize the control entry that corresponds to the second content player.

6. The method of claim 1, wherein the first content player does not receive the notification from the second content player that the second content player has received the second signal and the first content player does not receive the second signal, further comprising:

receiving a response to a confirmation to utilize the control device with a particular content player of the network of content players associated with one of the components of the particular type of component known to the control device to be associated with any content player of the network of content players; and instructing the control device to configure to control the particular content player.

7. The method of claim 6, wherein the particular content player is determined based on which of the components of the particular type of component known to the control device to be associated with any content player of the network of content players presented the confirmation to which the response responded.

8. The method of claim 7, wherein the control device includes at least one table of control entries received from at least one content player of the network of content players wherein each of the control entries correspond to a content player of the network of content players and include a set of command codes for at least one component associated with the content player and wherein said further instructing the control device to configure to control the particular content player comprises instructing the control device to utilize the control entry corresponding to the particular content player.

9. The method of claim 1, wherein the first content player receives the notification from the second content player that the second content player has received the second signal and wherein the at least one command includes at least one command code for the at least one component that is associated with the second content player.

10. A system for assisting use of control devices with different content players in a network of content players, comprising:

a first content player configured as part of a network of content players, comprising:

at least one receiver component that receives a first signal of a first type of signal from a control device that is configured to control the first content player wherein the control device transmitted the first signal as part of transmitting a plurality of signals indicating that a user intends to utilize the control device in a particular area, the plurality of signals further including a second signal of a second type of signal transmitted to a content player of the network of content players located in the particular area;

at least one communication component configured to receive notifications from other content players of the network of content players; and at least one least one processing unit configured to:

if the at least one communication component receives a notification from a second content player of the network of content players that the second content player has received the second signal, transmit at least one command to the control device via the at least one communication component commanding the control device to instruct at least one player-associated component that is associated with the second content player to activate wherein the at least one player-associated component that is associated with the second content player is a particular type of component; and if the at least one communication component does not receive the notification that the second content player has received the second signal and the content player first has not received the second signal, transmit at least one command to the control device via the at least one communication component commanding the control device to instruct all components of the particular type of component known to the control device to be associated with any content player of the network of content players to activate.

11. The system of claim 10, wherein the at least one communication component does not receive the notification that the second content player has received the second signal and the content player first has not received the second signal and wherein:

the at least one communication component receives a response to a confirmation to utilize the control device with a particular content player of the network of content players associated with one of the components of the particular type of component known to the control device to be associated with any content player of the network of content players wherein the particular content player is determined based on which of the components of the particular type of component known to the control device to be associated with any content player of the network of content players presented the confirmation to which the response responded, and the first content player instructs the control device to configure to control the particular content player.

12. The system of claim 11, wherein the control device includes at least one table of control entries received from at least one content player of the network of content players wherein each of the control entries correspond to a content player of the network of content players and include a set of command codes for at least one component associated with the content player and wherein the first content player instructs the control device to configure to control the particular content player by instructing the control device to utilize the control entry corresponding to the particular content player.

13. The system of claim 10, wherein the at least one communication component receives a notification from a second content player of the network of content players that the second content player has received the second signal and wherein:

the at least one communication component receives a response to a confirmation to utilize the control device with the second content player presented by the at least one component that is associated with the second content player, and the first content player instructs the control device to configure to control the second content player.

14. The system of claim 13, wherein the control device includes at least one table of control entries received from at least one content player of the network of content players wherein each of the control entries correspond to a content player of the network of content players and include a set of command codes for at least one component associated with the content player and wherein the first content player instructs the control device to configure to control the second content player by instructing the control device to utilize the control entry corresponding to the second content player.

15. The system of claim 10, wherein the first type of signal comprises at least one radio frequency signal and the second type of signal comprises at least one infrared signal.

16. A method for assisting use of control devices with different content players in a network of content players, the method comprising:

constructing, utilizing at least one content player of a network of content players, at least one table of control entries for at least one control device utilizing information received from at least one other content player of the network of content players wherein each of the control entries correspond to a content player of the network of content players and include a communication identifier for the content player and a set of command codes that are stored on a non-transitory machine-readable medium for at least one component associated with the content player;

determining, utilizing the at least one content player, to transmit the at least one table of control entries to the at least one control device wherein the at least one control device is operable to and configured to control one of the content players of the network of content players by utilizing the control entry that the one of the content players corresponds to; and transmitting the at least one table of control entries from the at least one content player to the at least one control device.

17. The method of claim 16, further comprising configuring the at least one control device to control the one of the content players of the network of content players by instructing the at least one control device to utilize the control entry that corresponds to the one of the content players.

18. The method of claim 16, further comprising receiving information from at least one other content player of the network of content players to include in the at least one table of control entries.

19. The method of claim 16, wherein the communication identifier comprises at least one radio frequency communication identifier and the set of command codes comprises at least one set of infrared command codes.

20. The method of claim 16, further comprising:

determining, utilizing the at least one content player, that information included in the at least one table of control entries has changed; and instructing, utilizing the at least one content player, the at least one control device to update the at least one table of control entries.

* * * * *